(12) United States Patent
Kikuchi

(10) Patent No.: US 10,389,443 B2
(45) Date of Patent: Aug. 20, 2019

(54) DECODING APPARATUS, DECODING METHOD AND NON-TRANSITORY COMPUTER READABLE RECORDING MEDIUM

(71) Applicant: CASIO COMPUTER CO., LTD., Tokyo (JP)

(72) Inventor: Masaaki Kikuchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/067,065

(22) Filed: Mar. 10, 2016

(65) Prior Publication Data

US 2016/0380697 A1  Dec. 29, 2016

(30) Foreign Application Priority Data

Jun. 24, 2015 (JP) ................................. 2015-127038

(51) Int. Cl.
*H04B 10/116* (2013.01)
*H04B 10/07* (2013.01)

(52) U.S. Cl.
CPC ........... *H04B 10/116* (2013.01); *H04B 10/07* (2013.01)

(58) Field of Classification Search
None
See application file for complete search history.

(56) References Cited

U.S. PATENT DOCUMENTS

2003/0058262 A1  3/2003  Sato et al.
2008/0312949 A1* 12/2008 Nagasaka ............... G06Q 30/02
                                                        705/1.1
2013/0141554 A1  6/2013  Ganick et al.
(Continued)

FOREIGN PATENT DOCUMENTS

JP       2003-179556 A   6/2003
JP       2008-35154 A    2/2008
(Continued)

OTHER PUBLICATIONS

JPO; Japanese Application No. 2015-127038; Notification of Reasons for Refusal dated Oct. 16, 2018.
(Continued)

*Primary Examiner* — Kenneth N Vanderpuye
*Assistant Examiner* — David W Lambert
(74) *Attorney, Agent, or Firm* — Fitch, Even, Tabin & Flannery LLP

(57) ABSTRACT

Markers 200-0~200-3 emit light, according to control by as server 100, in accordance with a light emission pattern. On the other hand, a mobile device 300 distinguishes a reference signal and a numerical signal based on a mode of light emission of the markers 200-0~200-3, and displays, upon receiving the numerical signal, a numerical value at a position of the marker 200 corresponding to the numerical signal in a frame, and displays, upon receiving the reference signal, ongoing reception of an ID at a position of the marker 200-0 corresponding to the reference signal in the frame. Furthermore, the mobile device 300 displays, at timing when all of the reference signals and the numerical signals are received, at a position of the marker 200-0 in the frame, a plurality of numerical values and units of the plurality of numerical values being integrated.

16 Claims, 8 Drawing Sheets

(56) References Cited

U.S. PATENT DOCUMENTS

2013/0163994 A1\*   6/2013   Iizuka ................ H04B 10/1149
                                                                398/130
2013/0290490 A1\*  10/2013   Kikuchi .................. H04L 67/02
                                                                709/219

FOREIGN PATENT DOCUMENTS

| JP | 2009-290530 A | 12/2009 |
|----|---------------|---------|
| JP | 2013-229767 A | 11/2013 |
| JP | 2014-183567 A |  9/2014 |

OTHER PUBLICATIONS

SIPO; Application No. 201610171693; First Office Action dated Feb. 24, 2018.

\* cited by examiner

FIG.1
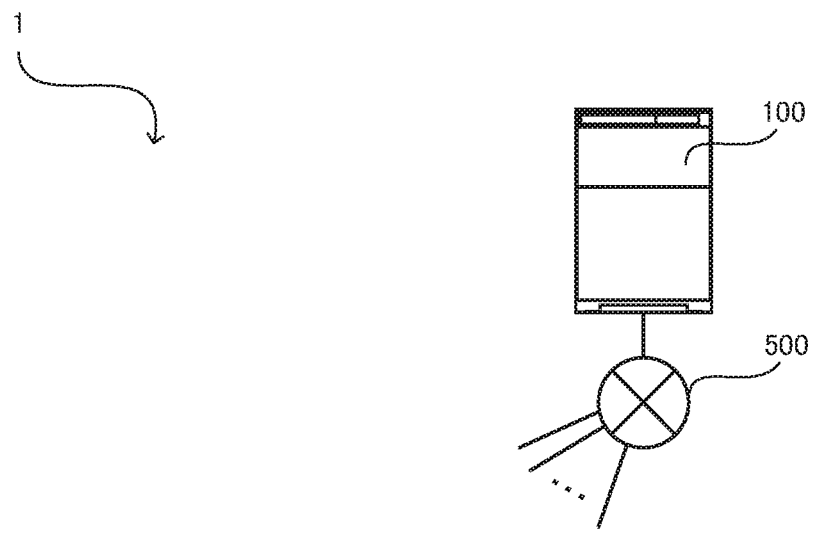
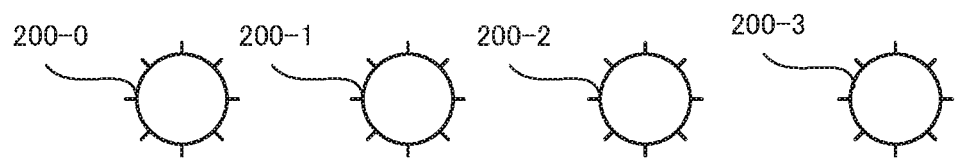
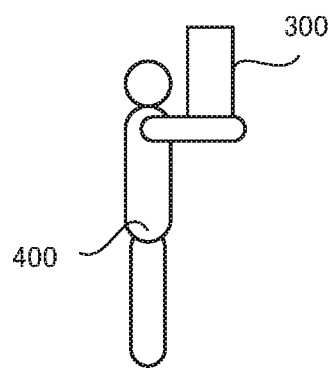

FIG.6

| | 251 | 252 | 253 | | | | 254 |
|---|---|---|---|---|---|---|---|
| 200-0 (LED0) | Bk | R | R G B | R G B | ... | R G B | R G B |
| 200-1 (LED1) | Bk | G | R G B | R G B | ... | R G B | R G B |
| 200-2 (LED2) | Bk | G | R G B | R G B | ... | R G B | R G B |
| 200-3 (LED3) | Bk | G | R G B | R G B | ... | R G B | R G B |

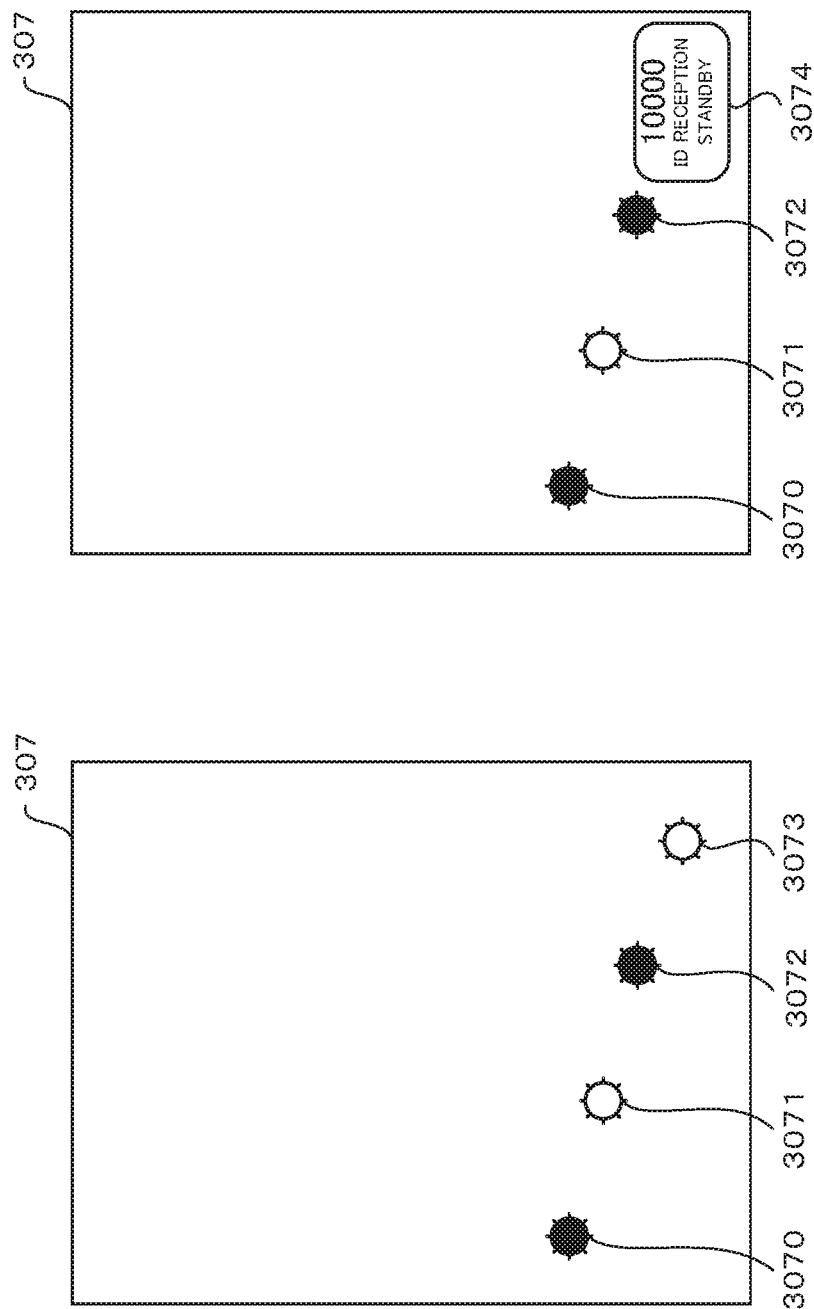

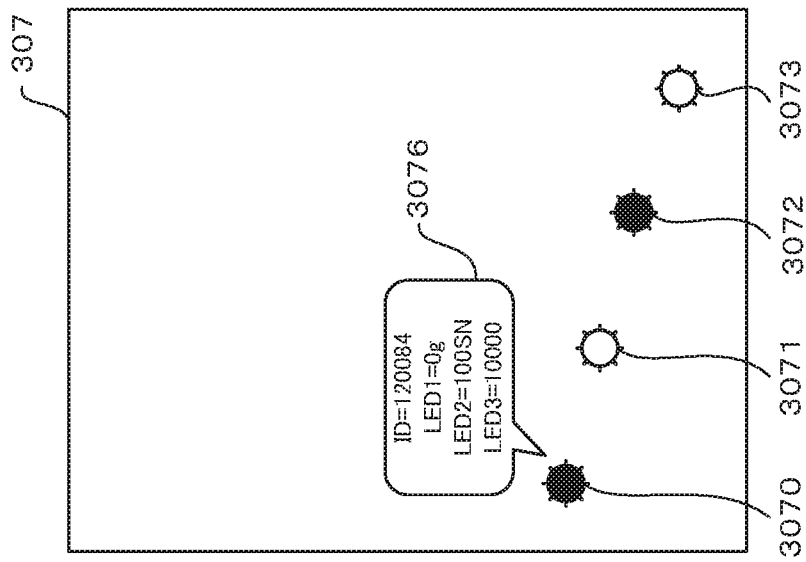
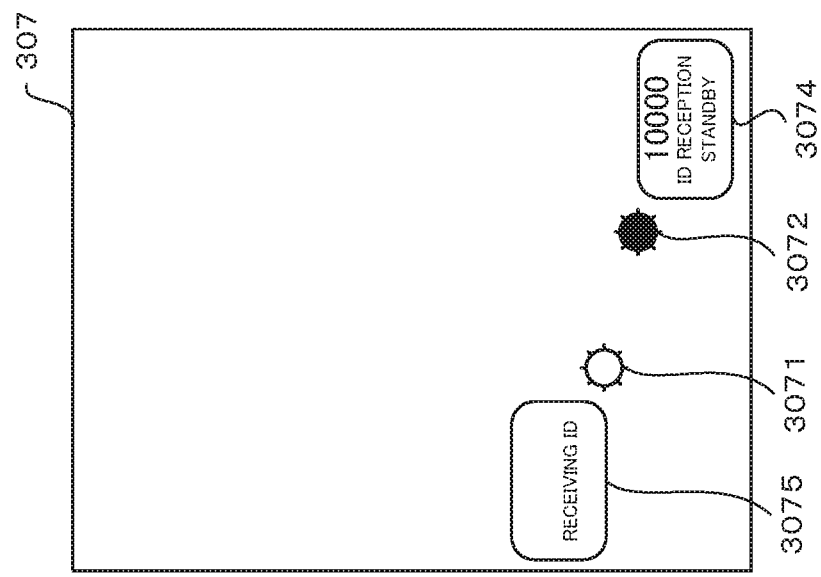

US 10,389,443 B2

DECODING APPARATUS, DECODING METHOD AND NON-TRANSITORY COMPUTER READABLE RECORDING MEDIUM

This application claims the benefit of Japanese Patent Application No. 2015-127038, filed on Jun. 24, 2015, the entire disclosure of which is incorporated by reference herein.

FIELD

The present disclosure relates to a decoding apparatus, a decoding method and a non-transitory computer readable recording medium.

BACKGROUND

A technology in which, in information transmission using visible light communication, a plurality of markers associated with a transmission device emits light, and a receiving device images the plurality of markers and acquires information based on a mode in which light is emitted has been know, as disclosed in Unexamined Japanese Patent Application Kokai Publication No. 2009-290530.

SUMMARY

A decoding apparatus according to the present disclosure is a decoding apparatus, comprising: a light receiver that receives light emitted by a marker for visible light communication; a decoder that decodes information based on light received by the light receiver; and a notifier that notifies when light received by the light receiver is a plurality of light having a predetermined relationship.

A decoding method according to the present disclosure is a decoding method, including: a light receiving step that receives light emitted by a marker for visible light communication; a decoding step that decodes information based on light received in the light receiving step; and a notifying step that notifies when light received in the light receiving step is a plurality of light having a predetermined relationship.

A non-transitory computer readable according to the present disclosure is a non-transitory computer readable recording medium on which a computer readable program is stored, the computer readable program causes a computer to function as: a light receiver that receives light emitted by a marker for visible light communication; a decoder that decodes information based on light received by the light receiver; and a notifier that notifies when light received by the light receiver is a plurality of light having a predetermined relationship.

BRIEF DESCRIPTION OF THE DRAWINGS

A more complete understanding of this disclosure can be obtained when the following detailed description is considered in conjunction with the following drawings, in which:

FIG. 1 is a drawing showing one example of an arrangement of a server, a marker and a mobile device constituting a visible light communication system according to an exemplary embodiment of the present disclosure;

FIG. 6 is a drawing showing one example of a light emission pattern of the marker according to the exemplary embodiment;

FIG. 8A is a drawing showing one example of an image display by the mobile device according to the exemplary embodiment;

FIG. 8B is a drawing showing one example of an image display by the mobile device according to the exemplary embodiment;

FIG. 8C is a drawing showing one example of an image display by the mobile device according to the exemplary embodiment;

FIG. 8D is a drawing showing one example of an image display by the mobile device according to the exemplary embodiment.

DETAILED DESCRIPTION

Figure 2:
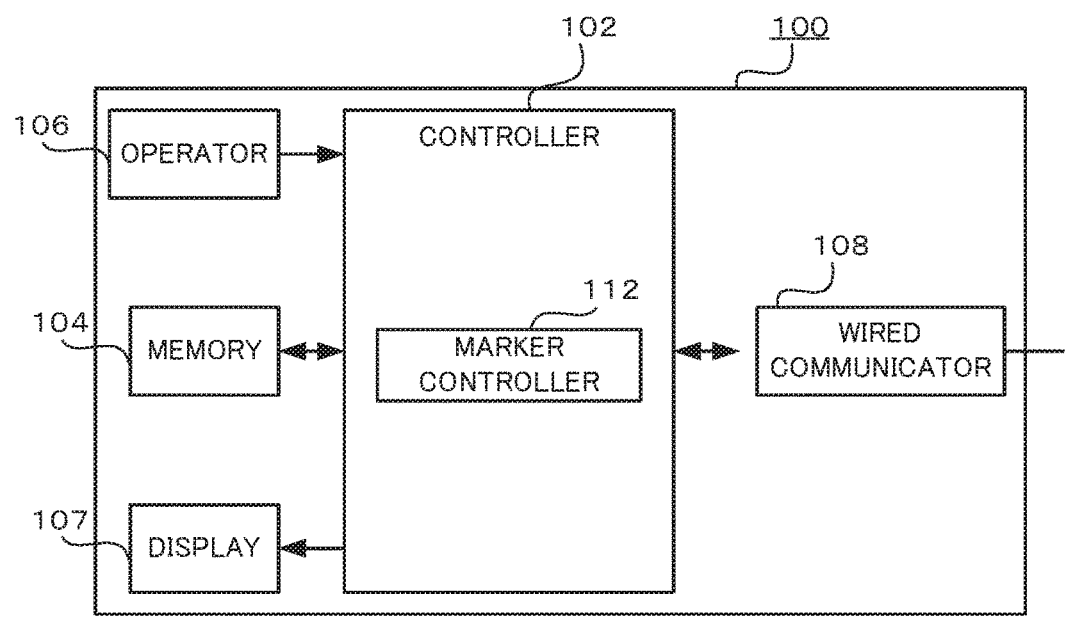
FIG. 2 is a drawing showing one example of a configuration of the server according to the exemplary embodiment.

Below, a visible-light communication system according to an exemplary embodiment of the present disclosure is described, with reference to the drawings.

FIG. 1 is a drawing showing a configuration of a visible-light communication system. As shown in FIG. 1, a visible-light communication system 1 comprises a server 100, markers 200-0~200-3 (below, the markers are generally abbreviated as "marker 200" unless respective markers 200-0~200-3 need to be specified), and a mobile device 300 as an imaging device. A visible-light communication control system comprises the server 100 and the marker 200.

The server 100 performs communication with the marker 200 via a communication network 500 and controls the marker 200. The marker 200 emits, according to control by the server 100, light modulated in accordance with various types of information. In this exemplary embodiment, the markers 200-0~200-3 are arranged, as is shown in FIG. 1, on a straight line in an order of, from left to right, the marker 200-0, the marker 200-1, the marker 200-2 and the marker 200-3. The mobile device 300 is a portable electronic device such as a tablet type personal computer, a mobile phone, a smartphone, a notebook type personal computer or the like. The mobile device 300 is carried by a user 400. The mobile device 300 images an area where the marker 200 is arranged, receives light emitted by the marker 200, acquires and displays information based on a mode in which the light is emitted.

FIG. 2 is a drawing showing a configuration of the server 100. As shown in FIG. 2, the server 100 includes a controller 102, a memory 104, an operator 106, a display 107 and a wired communicator 108.

The controller 102 comprises a central processing unit (CPU), for example. The controller 102 has a marker controller 112 in order to control various functions with which the server 100 is equipped, by executing a software process in accordance with a program (for example, a program for realizing actions of the server 100 shown in below-described FIG. 5) stored in the memory 104. The marker controller 112 controls luminance and hue (color of emitted light) of light emitted by the marker 200.

The memory 104 comprises a random access memory (RAM) and read-only memory (ROM), for example. The memory 104 stores various types of information (programs or the like) used in control or the like in the server 100. The wired communicator 108 comprises a local area network (LAN) card, for example. The wired communicator 108 performs communication with the marker 200 via the communication network 500.

The operator 106 comprises ten keys, function keys or the like, and is an interface used for inputting a user's operation contents. The display 107 comprises a liquid crystal display (LCD), plasma display panel (PDP), electroluminescence (EL) display or the like. The display 107 displays an image in accordance with an image signal output by the controller 102.

Figure 3:
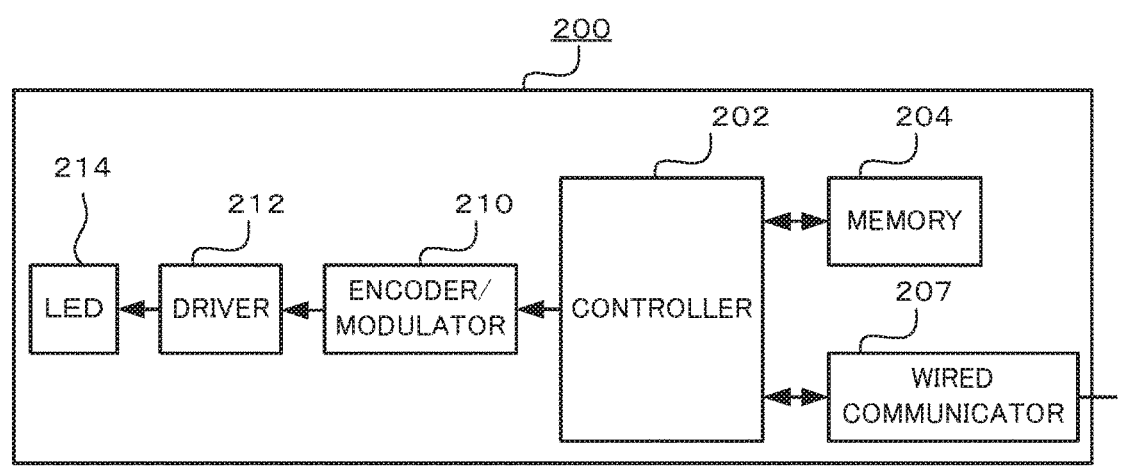
FIG. 3 is a drawing showing one example of a configuration of the marker according to the exemplary embodiment.

FIG. 3 is a drawing showing a configuration of the marker 200. As shown in FIG. 3, the marker 200 includes a controller 202, a memory 204, a wired communicator 207, an encoder/modulator 210, a driver 212 and a light emitting diode (LED) 214.

The controller 202 comprises a CPU, for example. The controller 202 controls various functions with which the marker 200 is equipped, by executing a software process in accordance with a program stored in the memory 204. The memory 204 comprises a RAM or a ROM, for example. The memory 204 stores various types of information (programs or the like) used in control or the like in the marker 200. The wired communicator 207 comprises a LAN card, for example. The wired communicator 207 performs communication with the server 100 via the communication network 500.

The encoder/modulator 210 encodes data output by the controller 202 into a bit data string. Furthermore, the encoder/modulator 210 performs digital modulation based on the bit data string. The driver 212 generates a driving signal for changing the luminance and hue of the light emitted by the LED 214 over time, in correspondence to a signal output by the encoder/modulator 210. The LED 214 emits light whose luminance and hue (color of emitted light) change over time, in accordance with the driving signal output by the driver 212.

Figure 4:
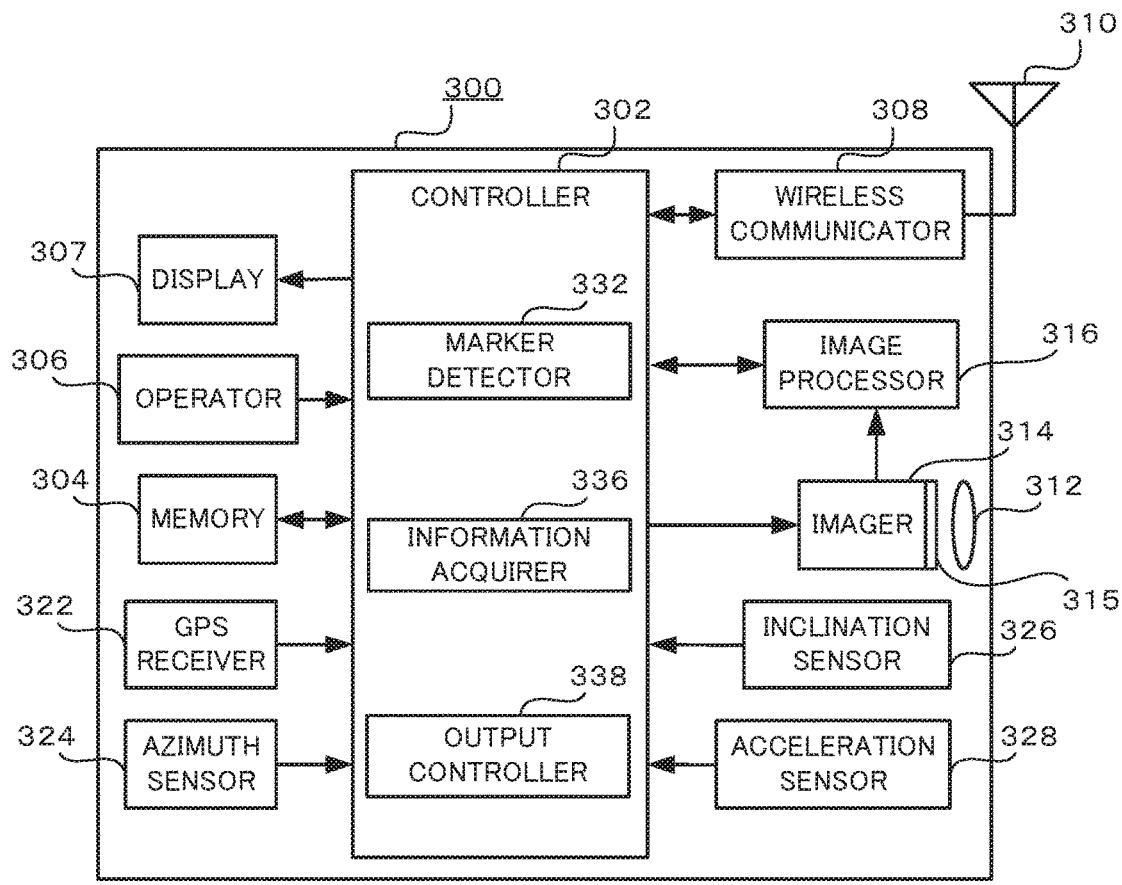
FIG. 4 is a drawing showing one example of a configuration of the mobile device according to the exemplary embodiment.

FIG. 4 is a drawing showing a configuration of the mobile device 300. The mobile device 300 shown in FIG. 4 includes a controller 302, a memory 304, an operator 306, a display 307, a wireless communicator 308, an antenna 310, a lens 312, an imager 314, an image processor 316, a Global Positioning System (GPS) receiver 322, a azimuth sensor 324, an inclination sensor 326 and an acceleration sensor 328.

The controller 302 comprises a CPU, for example. The controller 302 executes a software process in accordance with a program (for example, a program for realizing actions of the mobile device 300 shown in below-described FIG. 7) stored in the memory 304, and has a marker detector 332, an information acquirer 336 and an output controller 338 in order to realize various functions with which the mobile device 300 is equipped.

The marker detector 332 detects the marker 200 within a frame of the below-described image processor 316. The information acquirer 336 acquires information based on a mode in which the light is emitted by the marker 200. The output controller 338 performs control to display, at a position of the marker 200 within the frame, information based on a mode in which the light is emitted by the marker 200. The memory 304 comprises a RAM or a ROM, for example. The memory 304 stores various types of information (programs or the like) used in control or the like in the mobile device 300.

The operator 306 comprises ten keys, function keys, a touch panel or the like, and is an interface used for inputting a user's operation contents. The display 307 comprises an LCD, PCP, EL display or the like, for example. The display 307 displays an image (for example, below-described a through image) in accordance with an image signal output by the controller 302.

The wireless communicator 308 comprises a radio frequency (RF) circuit, a base band (BB) circuit or the like. The wireless communicator 308 performs transmission and reception of a wireless signal via the antenna 310. Furthermore, the wireless communicator 308 performs encoding and modulation of a transmitted signal, and decoding and demodulation of a received signal.

The lens 312 comprises a zoom lens or the like. The lens 312 moves in accordance with zoom control operation by the operator 306 and focus control by the controller 302. An imaging angle and an optical image imaged by the imager 314 are controlled by a movement of the lens 312.

The imager 314 comprises a plurality of light-receiving elements arranged in a regular two-dimensional arrangement on a light-receiving surface 315. The light-receiving elements are imaging devices such as charge coupled devices (CCD), complementary metal oxide semiconductors (CMOS) or the like, for example. The imager 314 images (receives light of), at a predetermined imaging angle, an optical image entered via the lens 312 based on a control signal from the controller 302, and generates a frame by converting an imaging signal in the imaging angle into digital data. In addition, the imager 314 performs imaging and frame generation consecutively timewise, and outputs consecutive frames to the image processor 316.

The image processor 316 modulates, based on a control signal from the controller 302, an image quality and an image size of a frame (digital data) output by the imager 314 to display it as a through image on the display 307, and outputs to the controller 302. In addition, the image processor 316 has a function of encoding and converting into a file, using a compression encoding method such as, for example, Joint Photographic Experts Group (JPEG) or the like, when a control signal based on a recording instruction operation from the operator 306 is input, an optical images either inside an imaging angle at the imager 314 when the recording instruction operation is input or within a display range to be displayed on the display 307.

The GPS receiver 322 receives a signal from a GPS satellite and, based on the signal, measures a position (latitude and longitude) of the mobile device 300. The azimuth sensor 324 detects, based on a change in terrestrial magnetism or the like, an azimuth of a imaging direction of the imager 314. The inclination sensor 326 measures an inclination of the mobile device 300. The acceleration sensor 328 measures acceleration of the mobile device 300.

Figure 5:
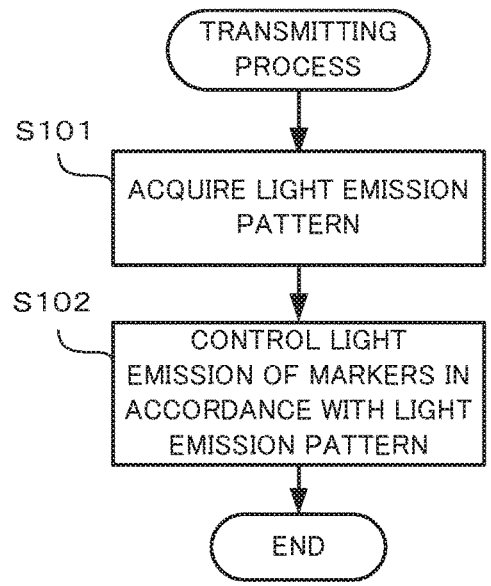
FIG. 5 is a flowchart showing one example of actions of a transmitting process using the marker by the server according to the exemplary embodiment.

Next, actions of the visible-light communication system 1 are described. FIG. 5 is a flowchart showing one example of actions of a transmitting process using the marker 200 by the server 100 of the visible-light communication system 1.

The marker controller 112 within the controller 102 of the server 100 acquires a light emission pattern of the marker 200 (step S101). The light emission pattern is set for the markers 200-0~200-3 respectively and chronologically indicates luminance, hue, and a time at which light is emitted with said luminance and hue. Information representing the light emission pattern is stored, for example, in the memory 104. The marker controller 112 reads out the information representing the light emission pattern stored in the memory 104. In this exemplary embodiment, the marker 200-0 is used to transmit a reference signal and the markers 200-1~200-3 is used to transmit numerical signals. Here, the reference signal is related information representing a relationship between numerical values represented by a plurality of numerical signals, and is an ID having a one-to-one correspondence with information (correspondence content), such as a unit of each numerical values represented by the numerical signals, a number of the markers 200 transmitting signals and a display mode of below-described integrated information. The ID and correspondence content are stored in the memory 104 of the server 100 in association with each other.

FIG. 6 is a drawing showing one example of the light emission pattern. In the light emission pattern shown in FIG. 6, the marker 200-0 sets turning off, that is, to be black (Bk), at the timing as a header 251, and after that, performs light emission of red (R), which indicates that this is the reference signal, once as a light emission action indicating an identifier 252. Next, light emission of any of red, green (G) or blue (B) is repeated for a predetermined number of times (for example, eight times) as a transmitting action of data 253 of the reference signal, and after that, light emission of any of red, green or blue is performed as a transmitting action of a parity 254. The markers 200-1~200-3 set turning off, that is, to be black (Bk), at the timing as the header 251, and after that, perform light emission of green (G) once in order to indicate that contents to be transmitted indicate the numerical signal, as the light emission action indicating the identifier 252. Next, light emission of any of red (R), green (G) or blue (B) is repeated for a predetermined number of times (for example, eight times) as a light emission action of the data 253 of the numerical signal, and after that, light emission of any of red, green or blue is performed as a transmitting action of the parity 254. These light emissions are not synchronized with each other while they are circular, and light emission cycle is, for example, 100 (msec).

Next, the marker controller 112 controls light emission by the markers 200-0~200-3 in accordance with the light emission pattern (step S102). Specifically, the marker controller 112 outputs, for each of the markers 200-0~200-3, at timing in accordance with the light emission pattern, information about luminance and hue in accordance with the light emission pattern to the wired communicator 108, and also outputs an Internet Protocol (IP) address and a Media Access Control (MAC) address or the like corresponding to the marker to which the information is transmitted to the wired communicator 108. The wired communicator 108 transmits, using the IP address, MAC address or the like corresponding to the marker 200 as a destination, the information about luminance and hue.

The wired communicator 207 in the marker 200 receives the information about luminance and hue having the IP address, MAC address or the like corresponding to the marker 200 as the destination, and outputs the information to the controller 202. The controller 202 outputs the information about luminance and hue to the encoder/modulator 210. The encoder/modulator 210 generates an encoded bit data string corresponding to a tag ID output by the controller 202 and also performs digital modulation based on the bit data string. The driver 212 generates a driving signal for changing luminance of light emitted by the LED 214 over time, in correspondence to a signal output by the encoder/modulator 210. The LED 214 emits light whose luminance and hue change over time, in accordance with the driving signal output by the driver 212.

Figure 7:
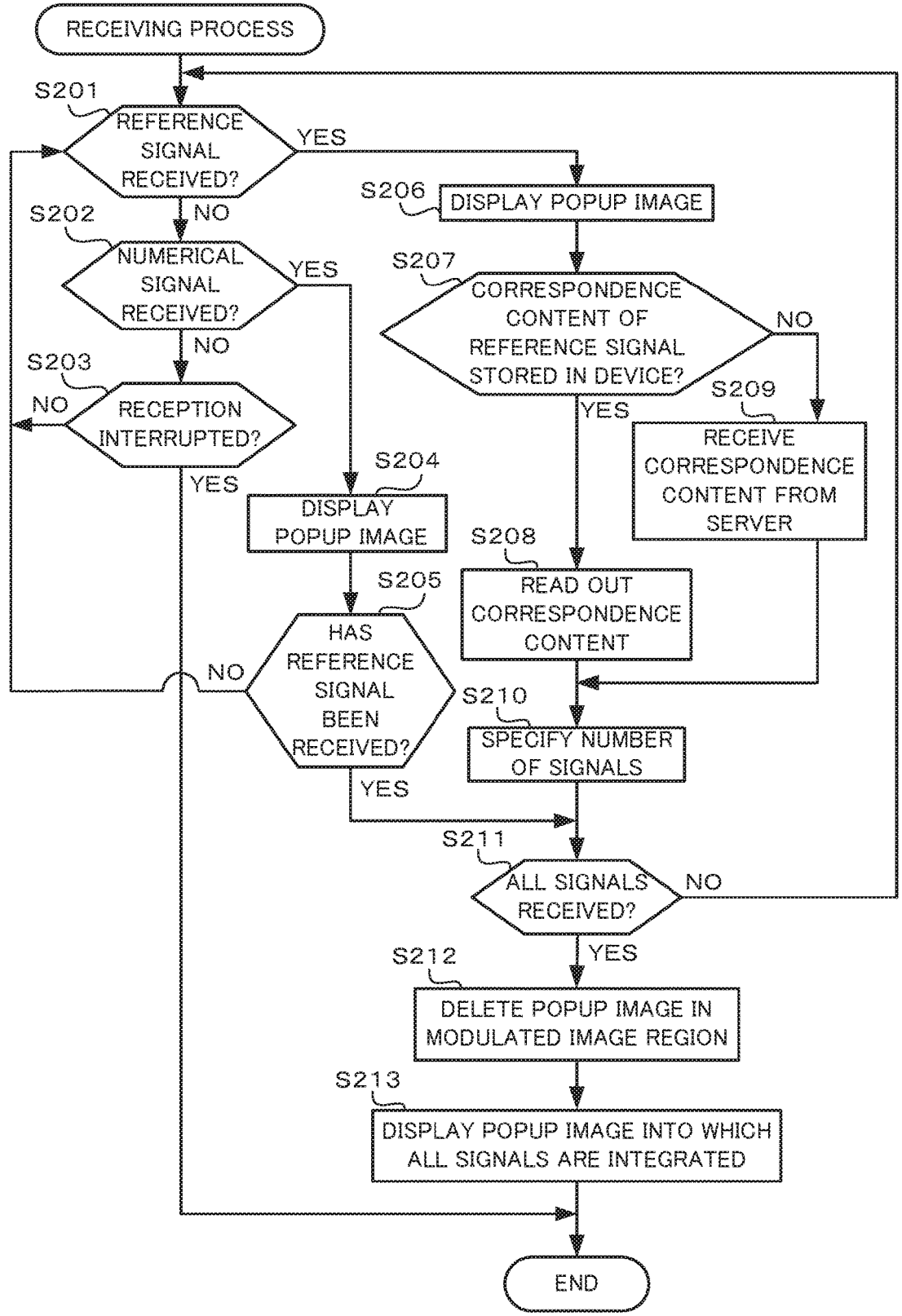
FIG. 7 is a flowchart showing one example of actions of a receiving process by the mobile device according to the exemplary embodiment.

FIG. 7 is a flowchart showing one example of actions of a receiving process by the mobile device 300. The flowchart in FIG. 7 shows actions when the marker 200 performs light emission in accordance with the light emission pattern shown in FIG. 6.

The marker detector 332 in the controller 302 of the mobile device 300 determines whether or not, by receiving light from the marker 200-0, the reference signal was received (step S201). Specifically, the marker detector 332 determines and measures luminance value of pixel, for example, luminance value at the pixel of the same coordinates in a plurality of frames as shown in FIG. 8A respectively. When, as a result, it is determined that luminance value at the pixel of predetermined coordinates within an imaging angle varies greatly so as to be equal to or more than a first predetermined value in one frame and be equal to or less than a second predetermined value in another frame, the pixel of predetermined coordinates are deemed as any of modulated image region (modulated image regions 3070~3073 in FIG. 8A) generated by receiving light from any of the marker 200 (markers 200-0~200-3). When it is deemed that a modulated image region exists, the marker detector 332 determines that the modulated image region corresponds to the marker 200. Furthermore, the marker detector 332 determines whether or not a light emission pattern of the modulated image region is the light emission pattern of the marker 200-0 (LED0) in FIG. 6. When a plurality of markers 200 are detected, the marker detector 332 determines whether or not a light emission pattern of any of the plurality of modulated image regions from the plurality of markers 200 is the light emission pattern of the marker 200-0 (LED0) in FIG. 6.

When the reference signal is not received (step S201: No), the marker detector 332 determines whether or not, by receiving light from at least any of the markers 200-1~200-3, a numerical signal was received (step S202). Specifically, as does same in step S201, the marker detector 332 determines and measures luminance value of pixel at the same coordinates in a plurality of frames respectively. When, as a result, it is determined that luminance value at predetermined coordinates within an imaging angle varies greatly so as to be more than a first predetermined value in one frame and be equal to or less than a second predetermined value in another frame, the predetermined coordinates are deemed as any modulated image regions generated by receiving light from the marker 200. When it is deemed that a modulated image region exists, the marker detector 332 determines that the modulated image region corresponds to one of the markers 200. Furthermore, the marker detector 332 determines whether or not a light emission pattern of the modulated image region is the light emission pattern of any of the marker 200-1 (LED1), the marker 200-2 (LED2) or the marker 200-3 (LED3) in FIG. 6. When a plurality of the markers 200 is detected, the marker detector 332 determines whether or not a light emission pattern of any of the plurality of modulated image regions corresponding to light emitted from the plurality of markers 200 is the light emission pattern of any of the marker 200-1 (LED1), the marker 200-2 (LED2) or the marker 200-3 (LED3) in FIG. 6.

When a numerical signal is not received (step S202: No), the marker detector 332 determines whether or not reception was interrupted (step S203). For example, when a modulated image region does not exist within a frame, or when a modulated image region initially existed within a frame disappears later, the marker detector 332 determines that reception was interrupted. When reception was interrupted (step S203: Yes), the receiving process ends, and when reception is not interrupted (step S203: No), the actions after step S201 are repeated.

On the other hand, when a numerical signal was received (step S202: Yes), the information acquirer 336 and the output controller 338 in the controller 302 perform display of a popup image to notify of reception of a numerical signal (step S204). Specifically, the information acquirer 336 acquires, by performing a decoding process, a numerical value having a one-to-one correspondence with a light emission pattern of the marker 200 that is the modulated image region in the frame. The output controller 338 performs control to display, at a position of the maker 200 that is the modulated image region corresponding to the numerical signal in the frame, the numerical value corresponding to the marker 200 and a reception status which are stacked. In this manner, as shown in FIG. 8B, a popup image 3074 including a numerical value and a reception status, namely, "10000_ID reception standby", is displayed at a position of a modulated image region 3073 corresponding to the numerical signal in the frame in FIG. 8A.

Next, the information acquirer 336 determines whether or not, by receiving light from the marker 200-0, the reference signal has been received (step S205). Specifically, the information acquirer 336 determines, when either one of the below-described step S208 or step S209 and the step S210 has already been performed and information (correspondence content) having a one-to-one correspondence with an ID represented by the reference signal is stored in the memory 304, that the reference signal has been received, and determines, when the correspondence content is not stored in the memory 304, that the reference signal has not been received. When the reference signal has not been received yet (step S205: No), the actions after step S201 are repeated.

On the other hand, when it is determined in step S201 that the reference signal was received (step S201: Yes), the information acquirer 336 and the output controller 338 in the controller 302 performs display of a popup image to notify of reception of the reference signal (step S206). Specifically, the information acquirer 336 acquires, by performing a decoding process, an ID from a light emission pattern of the marker 200-0 corresponding to the modulated image region corresponding to the reference signal in the frame. The output controller 338 performs control to display, at a position of the modulated image region corresponding to the reference signal in the frame, reception of the ID. In this manner, for example, a popup image 3075 indicating that the ID is being received is displayed which is stacked, as shown in FIG. 8C, at a position of a modulated image region 3070 corresponding to the reference signal in the frame in FIG. 8A.

Next, the information acquirer 336 determines whether or not correspondence content having a one-to-one correspondence with the ID represented by the reference signal is stored in the memory 304 in the mobile device 300 (step S207). When the correspondence content is stored in the memory 304, for example, the correspondence content and an ID having a one-to-one correspondence with the correspondence content are associated with each other. The information acquirer 336 determines whether or not correspondence content corresponding to the ID represented by the reference signal is stored in the memory 304.

When the correspondence content is stored in the memory 304 (step S207: Yes), the information acquirer 336 reads out the correspondence content having a one-to-one correspondence with the ID represented by the reference signal from the memory 304 (step S208). On the other hand, when the correspondence content is not stored in the memory 304 (step S207: No), the information acquirer 336 communicates with the server 100 via the wireless communicator 308 and the antenna 310 and requests, by transmitting the ID represented by the reference signal, the correspondence content having a one-to-one correspondence with the ID represented by the reference signal to the server 100. In response to this request, the server 100 transmits the correspondence content having a one-to-one correspondence with the ID represented by the reference signal. The information acquirer 336 receives the correspondence content from the sever 100 (step S209). The correspondence content received is stored in the memory 304 in association with the ID represented by the reference signal.

After readout of the correspondence content in step S208 or reception of the correspondence content from the server 100 in step S209, the information acquirer 336 specifies a number of signals based on information about a number of the markers 200 which transmit signals included in the correspondence content (step S210). Here, the number of signals means the number of markers 200.

After specification of the number of signals in step S210, or after it is determined in step S205 that the reference signal has been received (step S205: Yes), the information acquirer 336 determines whether or not all of the signals have been received, based on the number of signals specified in step S210 (step S211). Specifically, the information acquirer 336 determines, when a total number of the reference signal and numerical signals received matches the number of signals specified in step S210, that all signals have been received. When all of the signals have not been received yet (step S211: No), the actions after step S201 are repeated. On the other hand, when all of the signals have been received (step S211: Yes), the output controller 338 deletes the popup images displayed overlapping the positions of the markers 200 that are the modulated image regions in the frame (step S212).

Furthermore, the information acquirer 336 and the output controller 338 performs displaying of a popup image into which the references signal and all numerical signals are integrated (step S213). Specifically, the information acquirer 336 associates a unit of a numerical value included in the correspondence content corresponding to the reference signal and a numerical value expressed in this unit which is among a plurality of numerical values corresponding to the plurality of numerical signals. The output controller 338 performs control to display, at a position of the modulated image region corresponding to the reference signal which is among modulated image regions in the frame, in a display mode of integrated information included in the correspondence content corresponding to the reference signal, a popup image including a plurality of numerical values and a unit of said plurality of numerical values. In this manner, for example, as shown in FIG. 8D, a popup image 3076 displaying a plurality of numbers (0, 100, 10000) and units of said plurality of numbers (g, SN, none) are displayed near a modulated image region 3070 corresponding to the reference signal in the frame.

As is explained above, in this exemplary embodiment, the markers 200-0~200-3 perform, according to control by the server 100, light emission in accordance with a light emission pattern. On the other hand, the mobile device 300 distinguishes the reference signal and numerical signals based on a mode of light-emission by the markers 200-

0~200-3, and displays, upon receiving a numerical signal, a numerical value at a position of the marker 200 corresponding to said numerical signal in the frame (the position of the modulated image region), and displays, upon receiving the reference signal, reception of the ID at a position of the marker 200-0 corresponding to said reference signal in the frame (the position of the modulated image region). Furthermore, the mobile device 300 displays, at timing when all of the reference signals and numerical signals are received, at a position of the marker 200-0 in the frame (the position of the modulated image region), a plurality of numerical values and units of said numerical values being integrated. Consequently, the mobile device 300 does not have to synchronize timing of reception from a plurality of the markers 200, and furthermore, has high flexibility for it does not require modification when changes are made in a number or arrangement of the markers 200. In addition, by displaying reception, as a numerical value signal or a reference signal is received, at a position of the marker 200 which transmitted said signal, it allows a user to recognize status of reception.

The present disclosure is not limited by the above description of the exemplary embodiment or the drawings, and the above-described exemplary embodiment and drawings can be modified appropriately.

Figure 9:
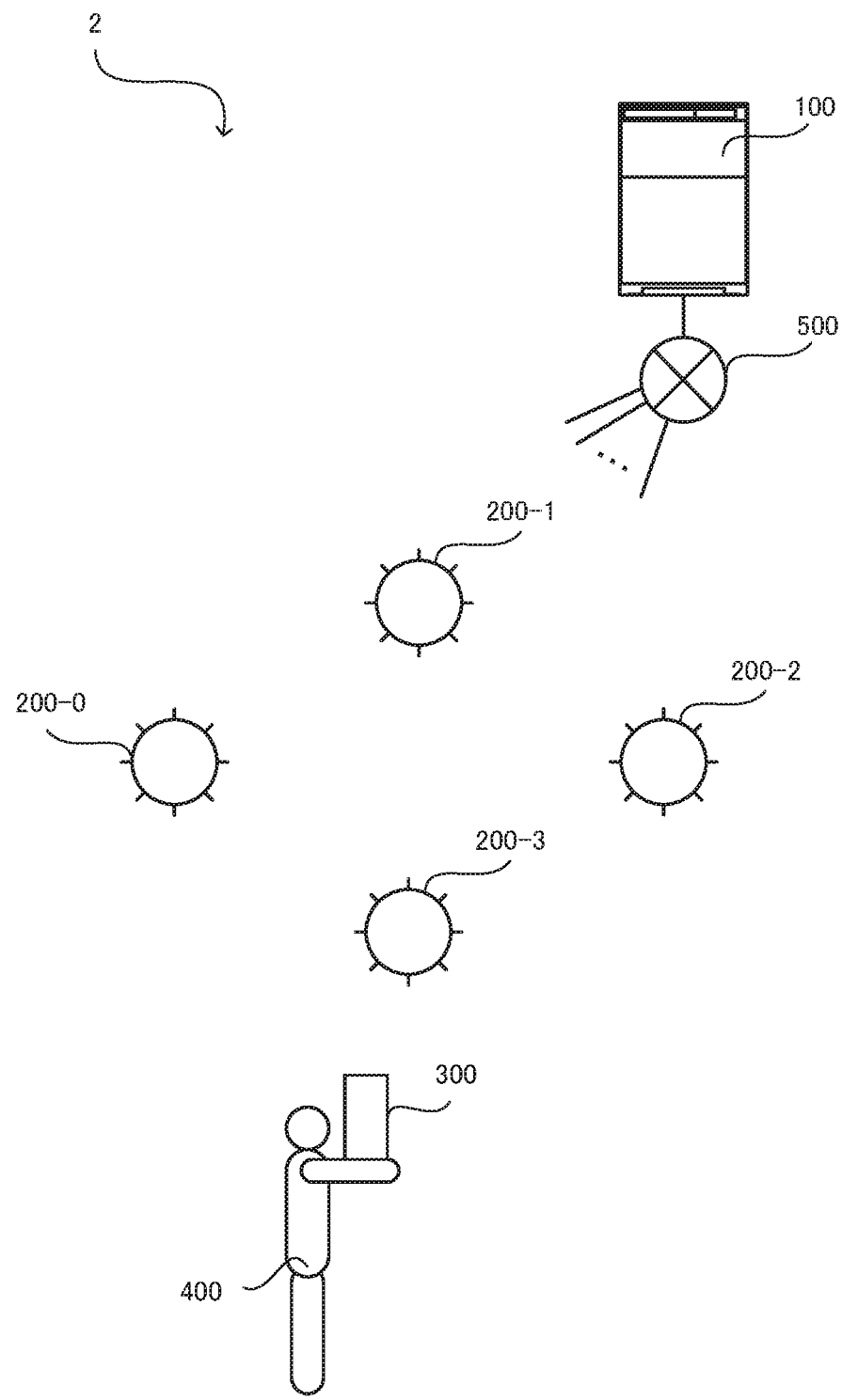
FIG. 9 is a drawing showing another example of an arrangement of a server, a marker and a mobile device constituting a visible light communication system according to an exemplary embodiment of the present disclosure.

For example, in the above-described exemplary embodiment, the markers 200-0~200-3 are arranged as shown in FIG. 1 in which the four markers 200 on a line. However, a number of the markers 200 may be any number equal to or more than 2, and the markers 200 may be arranged, for example, in a way the markers 200-0~200-3 are arranged in a visible light communication system 2 shown in FIG. 9. A number and arrangement of the markers 200 may be arbitrarily set as long as a light emission pattern of the reference signal and a light emission pattern of the numerical signal are different, and any of a plurality of the markers 200 transmits the reference signal while others transmit the numeral signals, as shown in FIG. 6.

In addition, while a case in which light of red (R), green (G) and blue (B) that is visible light is used in communication is explained in the above-described exemplary embodiment, visible light of any other color may be used, and further, non-visible light such as infrared light or the like may be used.

In addition, a light source in the marker 200 is not limited to LED. For example, the light source may be comprised in a portion of a LCD, a PDP, an EL display or the like which constitutes the display.

In addition, the mobile device 300 may be any kind of device as long as it is capable of imaging. For example, the mobile device 300 may be a personal handy-phone system (PHS), personal digital assistant or personal data assistant (PDA), tablet personal computer (PC), game device, portable music player or the like.

In addition, a device equipped with both functions of the mobile device 300 and the marker 200 may be prepared to make use of both functions depending on a situation.

In addition, in the above-described exemplary embodiment, a program to be executed may be stored in a non-transitory computer-readable recording medium such as a flexible disk, a compact disc read-only memory (CD-ROM), a digital versatile disc (DVD), a magneto-optical (MO) disc or the like, and be distributed to constitute a system that executes the above-described processes by installing said program.

In addition, the program may be stored in a disk device or the like comprised by a predetermined server on a network NW such as the Internet or the like, and for example, be downloaded or the like by being superimposed on carrier waves.

When the above-described functions are jointly realized by an operating system (OS) or realized by cooperation between the OS and an application program, only a portion other than the OS may be stored in a medium and distributed or downloaded or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A decoding apparatus, comprising:
an imager that images a plurality of markers for visible light communication, and receives a plurality of lights emitted by the plurality of markers;
a decoder that decodes the plurality of lights received by the imager to obtain information having pieces thereof;
a notifier; and
a controller, wherein
the controller determines whether reference information is included in each piece of information decoded by the decoder, and when the controller determines that the reference information is included, the controller determines whether a number of the decoded pieces of information satisfies a number of pieces of information defined by the reference information, and when the controller determines that the number of the decoded pieces of information satisfies the number of pieces of information defined by the reference information, the controller controls the notifier to provide notification that the controller determines that the number of the decoded pieces of information satisfies the number of pieces of information defined by the reference information.

2. The decoding apparatus according to claim 1, wherein the notifier comprises a display; and
when there is information that has been decoded by the decoder before all of the plurality of lights are received, the controller controls the display to display the information that has been decoded by the decoder.

3. The decoding apparatus according to claim 1, wherein the plurality of markers emits the plurality of lights with light emissions of the markers that are not synchronized with each other.

4. A decoding method, including:
an imaging step of imaging a plurality of markers for visible light communication, and receiving a plurality of lights emitted by the plurality of markers;
a decoding step of decoding with a decoder the plurality of lights received in the imaging step to obtain information having pieces thereof;
a control step that via a controller determines whether reference information is included in each piece of information decoded by the decoder, and when the controller determines that the reference information is included, the controller determines whether a number of the decoded pieces of information satisfies a number of pieces of information defined by the reference information, and when the controller determines that the number of the decoded pieces of information satisfies the number of pieces of information defined by the reference information, the controller controls a notifier to provide notification that the controller determines that the number of the decoded pieces of information satisfies the number of pieces of information defined by the reference information.

5. The decoding method according to claim 4, wherein, when there is information that has been decoded by the decoder before all of the plurality of lights are received, the controller in the control step controls a display to display the information that has been decoded by the decoder in the decoding step.

6. The decoding method according to claim 4, wherein the plurality of markers emits the plurality of lights with light emissions of the markers that are not synchronized with each other.

7. A non-transitory computer readable recording medium on which a computer readable program is stored, the computer readable program causes a computer to function as:
an imager that images a plurality of markers for visible light communication, and receives a plurality of lights emitted by the plurality of markers;
a decoder that decodes the plurality of lights received by the imager to obtain information having pieces thereof;
a notifier; and
a controller, wherein
the controller determines whether reference information is included in each piece of information decoded by the decoder, and when the controller determines that the reference information is included, the controller determines whether a number of the decoded pieces of information satisfies a number of pieces of information defined by the reference information, and when the controller determines that the number of the decoded pieces of information satisfies the number of pieces of information defined by the reference information, the controller controls the notifier to provide notification that the controller determines that the number of the decoded pieces of information satisfies the number of pieces of information defined by the reference information.

8. The decoding apparatus according to claim 1, wherein the notifier comprises a display; and
when the controller determines that the number of the decoded pieces of information satisfies the number of pieces of information defined by the reference information, the controller controls the display to display integrated information that integrates the information that is decoded by the decoder instead of displaying the information that is decoded by the decoder.

9. The decoding apparatus according to claim 1, wherein the notifier comprises a display; and
when the controller determines that the number of the decoded pieces of information satisfies the number of pieces of information defined by the reference information, the controller controls the display to display integrated information that integrates the information that is decoded by the decoder at any of positions displaying the plurality of lights.

10. The decoding apparatus according to claim 1, wherein the notifier comprises a display; and
until the controller determines that the number of the decoded pieces of information satisfies the number of pieces of information defined by the reference information, the controller controls the display to display the decoded information.

11. The decoding method according to claim 4, wherein the notifier comprises a display; and
when the controller determines that the number of the decoded pieces of information satisfies the number of pieces of information defined by the reference information, in the control step the controller controls the display to display integrated information that integrates the information that is decoded by the decoder instead of displaying the information that is decoded by the decoder.

12. The decoding method according to claim 4, wherein the notifier comprises a display; and
when the controller determines that the number of the decoded pieces of information satisfies the number of pieces of information defined by the reference information, in the control step the controller controls the display to display integrated information that integrates the information that is decoded by the decoder at any of positions displaying the plurality of lights.

13. The decoding method according to claim 4, wherein the notifier comprises a display; and
until the controller determines that the number of the decoded pieces of information satisfies the number of pieces of information defined by the reference information, in the control step the controller controls the display to display the decoded information.

14. The decoding apparatus according to claim 8, wherein, the controller controls the display to display the information decoded by the decoder by associating the decoded information with the plurality of lights included in the displayed image until the display displays the integrated information.

15. The decoding method according to claim 4, wherein, in the control step the controller controls the display to display the information decoded by the decoder by associating the decoded information with the plurality of lights included in the displayed image until the display displays the integrated information.

16. The non-transitory computer readable recording medium according to claim 7, wherein, the controller controls the display to display the information decoded by the decoder by associating the decoded information with the plurality of lights included in the display image until the display displays the integrated information.

* * * * *